(12) United States Patent
Fausak et al.

(10) Patent No.: US 8,793,029 B2
(45) Date of Patent: *Jul. 29, 2014

(54) SYSTEMS AND METHODS FOR CONTROLLING ENERGY CONSUMPTION

(75) Inventors: Andrew T. Fausak, San Jose, CA (US); Darren Ybarra, Horseshoe Bend, ID (US); Anthony Sun, Atherton, CA (US)

(73) Assignee: Asoka USA Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/564,919

(22) Filed: Aug. 2, 2012

(65) Prior Publication Data

US 2012/0296490 A1 Nov. 22, 2012

Related U.S. Application Data

(63) Continuation of application No. 12/426,124, filed on Apr. 17, 2009, now Pat. No. 8,239,073.

(60) Provisional application No. 61/045,824, filed on Apr. 17, 2008.

(51) Int. Cl.
| | |
|---|---|
| *G06F 1/26* | (2006.01) |
| *G01D 4/00* | (2006.01) |
| *H02J 3/14* | (2006.01) |
| *H02J 3/18* | (2006.01) |

(52) U.S. Cl.
CPC . *G01D 4/002* (2013.01); *H02J 3/14* (2013.01); *Y02B 90/241* (2013.01); *Y04S 20/327* (2013.01); *Y02B 90/244* (2013.01); *Y04S 20/32* (2013.01); *H02J 3/18* (2013.01)
USPC ............ 700/297; 700/276; 700/291; 700/295

(58) Field of Classification Search
USPC .......................... 700/297, 286, 295, 296, 276; 236/870.02; 340/870.02; 705/412; 709/224

See application file for complete search history.

(56) References Cited

U.S. PATENT DOCUMENTS

| | | | |
|---|---|---|---|
| 4,327,416 A * | 4/1982 | Jerrim | 702/104 |
| 4,370,723 A | 1/1983 | Huffman et al. | |
| 4,749,992 A | 6/1988 | Fitzemeyer et al. | |
| 4,819,180 A | 4/1989 | Hedman et al. | |
| 4,847,781 A | 7/1989 | Brown et al. | |
| 5,289,362 A | 2/1994 | Liebl et al. | |
| 5,572,438 A | 11/1996 | Ehlers et al. | |
| 5,924,486 A * | 7/1999 | Ehlers et al. | 236/46 R |
| 5,927,598 A | 7/1999 | Broe | |

(Continued)

FOREIGN PATENT DOCUMENTS

JP 2004362326 A * 12/2004 ............. G08C 15/00

OTHER PUBLICATIONS

U.S. Appl. No. 12/395,428, filed Feb. 2009, Fausak et al.

*Primary Examiner* — Mohammad Ali
*Assistant Examiner* — Kelvin Booker
(74) *Attorney, Agent, or Firm* — Baker Botts L.L.P.

(57) ABSTRACT

In particular embodiments, an energy gateway is described that is configured to receive power usage information from one or more power meters, transmit the power usage information to an energy management server, receive control signals from the energy management server, transmit the control signals to the one or more power switches and execute localized pre-programmed rules.

20 Claims, 10 Drawing Sheets

(56) References Cited

U.S. PATENT DOCUMENTS

| | | | |
|---|---|---|---|
| 6,216,956 B1 * | 4/2001 | Ehlers et al. .................... 236/47 |
| 6,492,910 B1 | 12/2002 | Ragle et al. |
| 6,519,509 B1 | 2/2003 | Nierlich et al. |
| 6,681,154 B2 | 1/2004 | Nierlich et al. |
| 6,785,592 B1 | 8/2004 | Smith et al. |
| 6,912,664 B2 | 6/2005 | Ranganathan et al. |
| 6,922,558 B2 | 7/2005 | Delp et al. |
| 7,039,532 B2 | 5/2006 | Hunter |
| 7,088,014 B2 | 8/2006 | Nierlich et al. |
| 7,130,719 B2 | 10/2006 | Ehlers et al. |
| 7,248,158 B2 | 7/2007 | Berkman et al. |
| 7,317,404 B2 | 1/2008 | Cumeralto et al. |
| 7,343,226 B2 | 3/2008 | Ehlers et al. |
| 7,379,997 B2 | 5/2008 | Ehlers et al. |
| 7,418,428 B2 | 8/2008 | Ehlers et al. |
| 7,479,944 B2 | 1/2009 | Casebolt et al. |
| 7,490,045 B1 | 2/2009 | Flores et al. |
| 7,516,106 B2 | 4/2009 | Ehlers et al. |
| 7,546,214 B2 | 6/2009 | Rivers et al. |
| 7,590,472 B2 | 9/2009 | Hakim et al. |
| 7,693,670 B2 | 4/2010 | Durling et al. |
| 7,702,424 B2 | 4/2010 | Cannon et al. |
| 7,706,928 B1 | 4/2010 | Howell et al. |
| 7,715,951 B2 | 5/2010 | Forbes et al. |
| 7,719,440 B2 | 5/2010 | Delp et al. |
| 7,869,904 B2 | 1/2011 | Cannon et al. |
| 7,949,615 B2 | 5/2011 | Ehlers et al. |
| 7,957,846 B2 | 6/2011 | Hakim et al. |
| 8,103,389 B2 | 1/2012 | Golden et al. |
| 8,350,697 B2 * | 1/2013 | Trundle et al. ............. 340/539.3 |
| 8,386,087 B2 * | 2/2013 | Spicer et al. .................. 700/291 |
| 2002/0152298 A1 | 10/2002 | Kikta et al. |
| 2003/0009265 A1 | 1/2003 | Edwin |
| 2003/0009401 A1 | 1/2003 | Ellis |
| 2003/0144864 A1 * | 7/2003 | Mazzarella ........................ 705/1 |
| 2004/0006439 A1 | 1/2004 | Hunter |
| 2004/0054789 A1 | 3/2004 | Breh et al. |
| 2004/0153170 A1 * | 8/2004 | Santacatterina et al. ........... 700/1 |
| 2004/0222307 A1 * | 11/2004 | DeLuca ..................... 236/46 R |
| 2005/0033707 A1 | 2/2005 | Ehlers et al. |
| 2005/0137813 A1 | 6/2005 | Swarztrauber et al. |
| 2006/0161270 A1 | 7/2006 | Luskin et al. |
| 2006/0161450 A1 | 7/2006 | Carey et al. |
| 2006/0271244 A1 | 11/2006 | Cumming et al. |
| 2006/0281435 A1 | 12/2006 | Shearer et al. |
| 2007/0043478 A1 | 2/2007 | Ehlers et al. |
| 2007/0145915 A1 | 6/2007 | Roberge et al. |
| 2007/0241203 A1 | 10/2007 | Wagner et al. |
| 2007/0271006 A1 | 11/2007 | Golden et al. |
| 2007/0276547 A1 | 11/2007 | Miller |
| 2008/0091590 A1 | 4/2008 | Kremen |
| 2008/0147465 A1 | 6/2008 | Raines et al. |
| 2008/0185451 A1 | 8/2008 | Simon et al. |
| 2008/0272934 A1 | 11/2008 | Wang et al. |
| 2008/0318562 A1 | 12/2008 | Featherstone et al. |
| 2009/0094173 A1 | 4/2009 | Smith et al. |
| 2009/0240380 A1 | 9/2009 | Shah et al. |
| 2010/0131117 A1 * | 5/2010 | Mattiocco et al. ............. 700/295 |
| 2010/0145534 A1 | 6/2010 | Forbes et al. |
| 2010/0161148 A1 | 6/2010 | Forbes et al. |
| 2010/0163634 A1 | 7/2010 | Klein et al. |
| 2010/0198713 A1 | 8/2010 | Forbes et al. |
| 2010/0217452 A1 | 8/2010 | McCord et al. |
| 2010/0217549 A1 | 8/2010 | Galvin et al. |
| 2010/0217550 A1 | 8/2010 | Crabtree et al. |
| 2010/0217651 A1 | 8/2010 | Crabtree et al. |
| 2010/0222935 A1 | 9/2010 | Forbes et al. |
| 2010/0235008 A1 | 9/2010 | Forbes et al. |
| 2010/0235010 A1 * | 9/2010 | Cooper et al. ................. 700/295 |
| 2010/0262311 A1 * | 10/2010 | Santacatterina et al. ....... 700/291 |
| 2010/0274366 A1 | 10/2010 | Fata et al. |
| 2010/0293045 A1 | 11/2010 | Burns et al. |
| 2010/0328314 A1 | 12/2010 | Ellingham et al. |
| 2011/0015801 A1 * | 1/2011 | Mazzarella ................... 700/297 |
| 2011/0016055 A1 * | 1/2011 | Mazzarella ................... 705/317 |
| 2011/0057044 A1 | 3/2011 | Nishino et al. |
| 2011/0077758 A1 | 3/2011 | Tran et al. |
| 2011/0095017 A1 | 4/2011 | Steurer |
| 2011/0098869 A1 | 4/2011 | Seo et al. |
| 2011/0130880 A1 | 6/2011 | Nishino et al. |
| 2011/0145611 A1 | 6/2011 | Lee |
| 2011/0153109 A1 * | 6/2011 | Drake et al. .................. 700/296 |
| 2011/0161124 A1 | 6/2011 | Lappinga et al. |
| 2011/0161251 A1 | 6/2011 | Carey et al. |
| 2011/0176257 A1 | 7/2011 | Uselton et al. |
| 2011/0184581 A1 | 7/2011 | Storch et al. |
| 2011/0231788 A1 * | 9/2011 | Santinato et al. ............. 715/771 |
| 2011/0264286 A1 | 10/2011 | Park |

* cited by examiner

| Energy Management - Home Console | | | | | |
|---|---|---|---|---|---|
| electricity usage | demand response | power type | meters | account | sign out |

Demand Response

During times of high demand or emergency, you may allow your power provider to progressively reduce your power usage based on these settings.

Power Demand State: (No Power Reduction) Your power provider may set either: Off, Alert, Warning, or Emergency.

Choose what appliances may be adjusted in those states:

| Appliance | Manual | Alert (1) | Warning (2) | Emergency (3) | Change |
|---|---|---|---|---|---|
| Heater/Air Conditioner | ○ | ○ | ○ | ● | Temperature +/- degrees (adjust) |
| Refrigerator | ○ | ○ | ○ | ● | Turned Off no more than 30% of the time |
| Pool Pump | ○ | ○ | ○ | ● | Pump times delayed |
| Spa | ○ | ○ | ○ | ● | Pump throttled |
| Electric Water Heater | ○ | ○ | ○ | ● | Turned off 20% of time |
| Washer | ○ | ○ | ○ | ● | Turned Off |
| Dryer | ○ | ○ | ○ | ● | Turned Off |
| Stove | ○ | ○ | ○ | ● | Turned Off |
| Oven | ○ | ○ | ○ | ● | Turned Off |
| Microwave | ○ | ○ | ○ | ● | Turned Off |
| Lighting | ○ | ○ | ○ | ● | Some lights dimmed 20% |

[Update Settings]   [Done]

Energy Management - Home Console

| electricity usage | demand response | power type | meters | account | sign out |

Power Type

Choose alternative power types.

Each will contribute up to 20% of your total power, with a maximum of 40%. The remainder is supplied by standard power, with a graded cost per KwH.

☐ Hydroelectric ($0.41 / kwh)

☐ Wind ($0.44 / kwh)

☐ Solar ($0.54 / kwh)

[Change Power Types]

[Done]

Changing power type effects carbon output and cost.

Cost $: Current 219.86, New Projected 219.86

Lbs of $CO_2$: Current 512.28, New $CO_2$ Rate 512.28

318

318

Demand Response    Done

Current Demand Response State: OFF

Warning: changing state affects customer
Appliance settings and overall power consumption Change State:

○ Off (approx. 0Mw reduction)
○ Alert (approx. 1217 Mw reduction)
○ Warning (approx. 3407 Mw reduction)
⦿ Stage 1 Emergency (approx. 12,722 Mw reduction)

[Change State]    [Done]

Logged in as All    Set Tariffs    Logout

*FIG. 8*

| | | | | Logged in as All    Set Tariffs    Logout |
|---|---|---|---|---|

318

All Residences    All Accounts...

Demand Response : OFF    Change State

Create New Residence

| Action | | | Street Address | City | Account Holder |
|---|---|---|---|---|---|
| View | Edit | Delete | 1063 Micro Court | San Jose | Account Holder |
| View | Edit | Delete | 1017 SE 34th Ave | Portland | Joe Smith |
| View | Edit | Delete | 25254 Stevens Creek Blvd | Cupertino | Martha Williams |
| View | Edit | Delete | 123 Main Street | Sometown | Generic Name |
| | | | | | Example Account | kwh
900
800
700
600
500
400
300
200
100
0

1063 Micro Court    1017 SE 34th Ave    25254 Stevens Creek Blvd    123 Main Street

*FIG. 9*

Set Tariffs

Select new tariff rates for each power type

Std (Tier 1)   $0.06
Std (Tier 2)   $0.12
Std (Tier 3)   $0.22
Std (Tier 4)   $0.32
Hydroelectric  $0.40
Wind           $0.44
Solar          $0.54

[Update Tariff Rates]

[Done]

Tier Accounts (in KwH)

Tier 1   200
Tier 2   200
Tier 3   200
Tier 4   200

Logged in as All    Set Tariffs    Logout

SYSTEMS AND METHODS FOR CONTROLLING ENERGY CONSUMPTION

CROSS REFERENCE TO RELATED APPLICATIONS

This application is a continuation of U.S. patent application Ser. No. 12/426,124 filed Apr. 17, 2009, now U.S. Pat. No. 8,239,073. U.S. patent application Ser. No. 12/426,124 claims the benefit of priority under 35 U.S.C. 119(e) to U.S. Provisional Patent Application No. 61/045,824 filed Apr. 17, 2008, and entitled SYSTEM AND METHOD OF CONTROLLING ENERGY CONSUMPTION, which is hereby incorporated by reference herein.

TECHNICAL FIELD

The present disclosure relates generally to systems and methods for controlling energy consumption.

BACKGROUND

Energy efficiency is widely viewed as the easiest, fastest, and least expensive way to satisfy the ever increasing energy demand requirements in the United States and throughout many countries in the world. Energy efficiency measures also improve bottom profit margins, help avoid power outages, and offset the need for new power sources.

In electricity grids, demand response has been used to manage customer consumption of electricity in response to supply conditions. By way of example, demand response has been used to have electricity customers reduce their consumption at critical times or in response to market prices. Demand response can involve actually curtailing power used or switching consumption from grid to the onsite generation of electricity. This is quite a different concept than energy efficiency, which refers to using less power to perform the same tasks on, for example, a continuous basis or whenever a particular task is performed. Conventional demand response schemes are implemented with large commercial customers, often through the use of dedicated control systems that shed loads in response to a request by a utility provider or market price condition.

BRIEF DESCRIPTION OF THE DRAWINGS

FIG. 3B illustrates a user interface for specifying power management information.

FIG. 7 illustrates a user interface for choosing a power type.

FIG. 8 illustrates a user interface for showing energy consumption (or savings) associated with various states of demand response.

FIG. 9 illustrates a user interface for entering power management information for multiple addresses.

FIG. 10 illustrates a user interface for use by a utility/power company in setting various "tariffs" for various types of energy usage.

DESCRIPTION OF EXAMPLE EMBODIMENTS

Figure 1A:
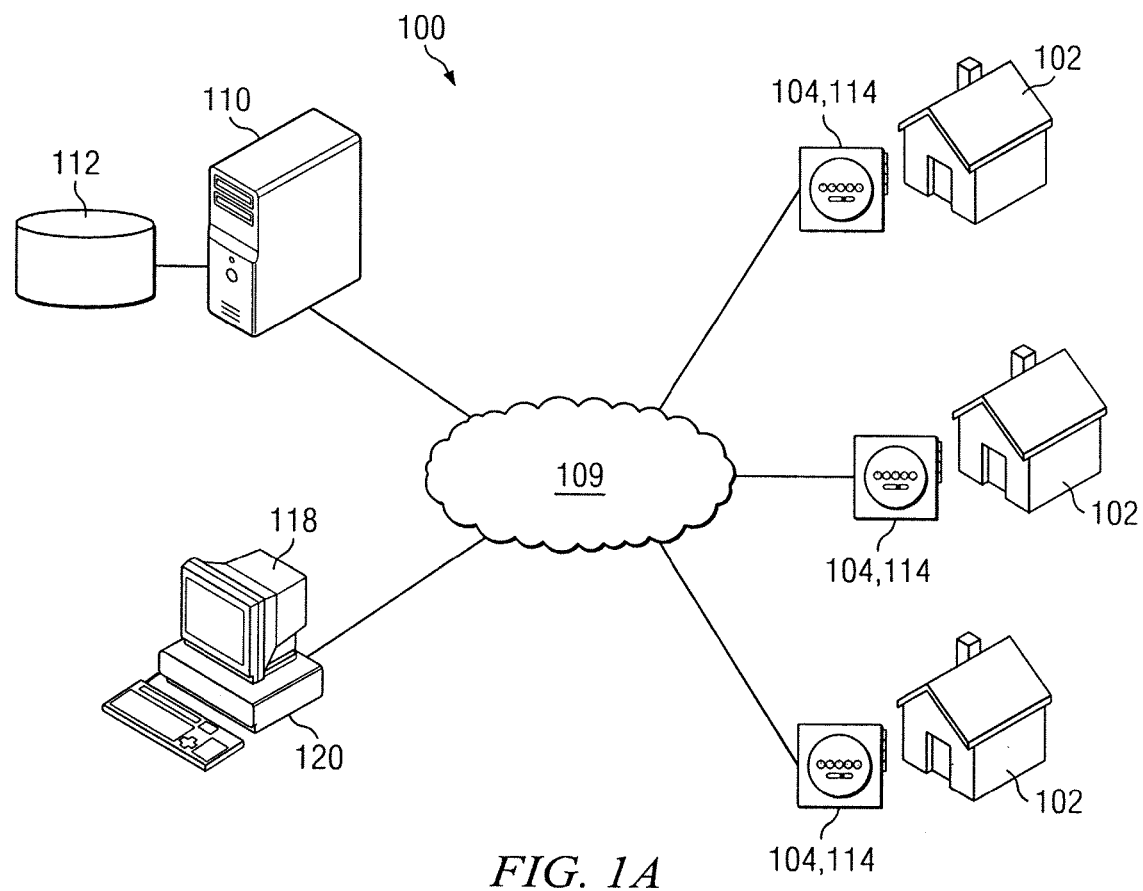
FIGS. 1A and 1B illustrate an example energy optimization system.

The present disclosure relates generally to systems and methods for controlling energy consumption. Referring initially to FIG. 1A, particular embodiments provide an energy optimization system (hereinafter also energy optimization network) 100 that optimizes energy usage, reducing power consumption and eliminating waste, by dynamically managing and controlling potentially all energy-consuming devices at a user's property. More particularly, Energy Optimization System 100 enables a user (e.g., a manager, owner, employee, or resident) to dynamically adjust energy usage throughout the day, week, month or year throughout the user's property.

Figure 1B:
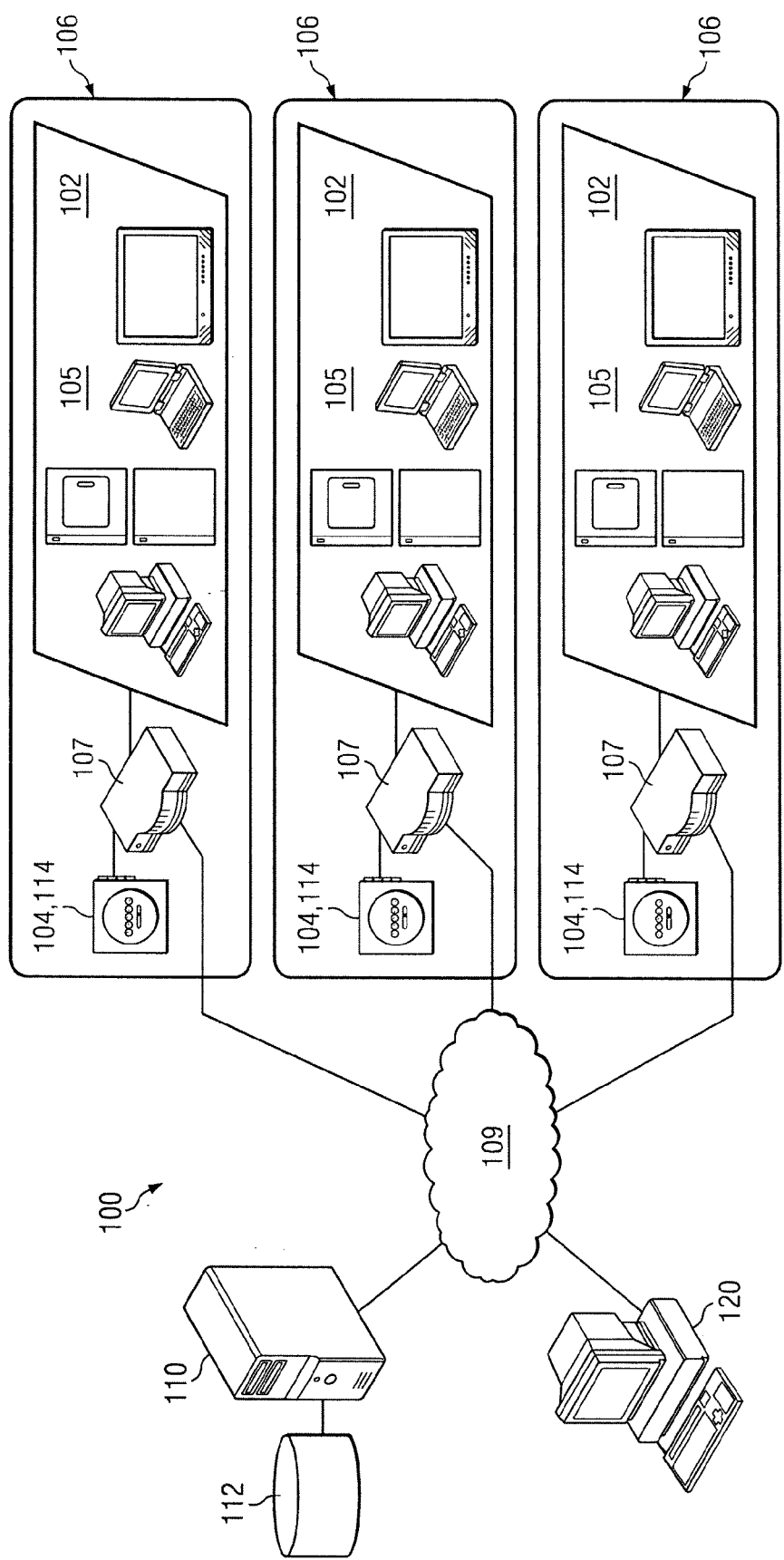

In the embodiment illustrated in FIG. 1A, a plurality of buildings 102 are part of Energy Optimization System 100. Each of the buildings 102 has a power meter 104 that is electrically connected with a main power distribution line of an electrical grid that supplies energy (i.e., power) to the building. In various embodiments, each building 102 may represent a residence (e.g., single home, duplex, condominium, apartment, etc.), a commercial or government building, a hospital, a hotel, or even an entire campus, among other possibilities, as well as the surrounding property, where power usage may be monitored. Although only one power meter 104 is shown per building 102 in FIG. 1A, power meter 104 may actually represent one or more power meters that are coupled together at or within the building 102. By way of example and not by way of limitation, power meter 104 may collectively represent in FIG. 1B both a main power meter 104a that connects to the main power distribution line of the electrical grid as well as additional sub power meters 104b (hereinafter also "power point power meters") that are coupled to various power usage points 105 within building noted in FIG. 1A by 102. By way of example and not by way of limitation, in FIG. 1B, power usage points 105 may include various electrical systems, units, appliances, devices, outlets, and switches connected to system 100 noted in FIG. 1A. In particular embodiments, the sub power meters 104b may be connected with one another and to the main power meter 104a to form a sub network 106 as illustrated in FIG. 1B.

In particular embodiments, energy optimization system 100 utilizes the most cost-effective network transport available within a given property. By way of example and not by way of limitation, network transport may occur over an Ethernet and/or power line network (PLN) using, for example, existing electrical wiring. Power line networking, also known as power line communication (PLC), power line carrier, power line digital subscriber line (PDSL), mains communication, or power line telecom (PLT), generally refers to a system for carrying data on/over conducting lines that are also used for electric power transmission. Conventionally, electrical power is transmitted over high voltage transmission lines, distributed over medium voltages, and used inside buildings at lower voltages. PLC may be applied at each stage. PLC may cross between one or more sets of wires (e.g., cross between the distribution network level and premises wiring level).

In particular embodiments, one or more power meters 104 of a particular building 102 may be configured to share information such as power consumption (usage) over time on/over network 106. Additionally, the networks 106 of each building may be connected over, for example, a modem 107 to an exterior network 109 (e.g., public internet and/or smart electrical grid) or exterior distribution lines to form multi-building energy optimization system 100.

In particular embodiments, energy optimization system 100 enables communication across all rooms and buildings of a given user's (or group of users') property, optimizing energy use throughout the entire property. Furthermore, energy optimization system 100 provides a seamless link to the electrical grid, which may be a smart grid and which may include a demand response system to the utility company providing the electricity over the grid. By way of reference, a smart grid delivers electricity from suppliers to consumers using as dictated by intelligent switching technology to conserve energy, reduce cost and increase reliability. A smart grid may be considered as a means to prod consumers that recklessly consume electricity, thereby changing their behavior. Moreover, usage can be modified around variable electric rates. Failure to reduce electrical consumption during demand response conditions will result in paying increased rates. Moreover, those that participate will enable reliable electrical service during high demand conditions, and reduced rates during low demand conditions.

In particular embodiments, energy optimization system 100 includes a centralized energy management server 110 that receives power usage information and identifying information from one or more buildings 102 as well as power management information from a user. As will be described in more detail below, energy management server 110 is configured to process, analyze and store the power usage information and identifying information in the central database 112, and furthermore, transmit power control signals to the buildings 102 to control the power usage of one or more power usage points 105 in the buildings based on the power management information. In particular embodiments, energy management server 110 is also configured to generate power usage reports to indicate consumption information in each building 102.

Figure 2:
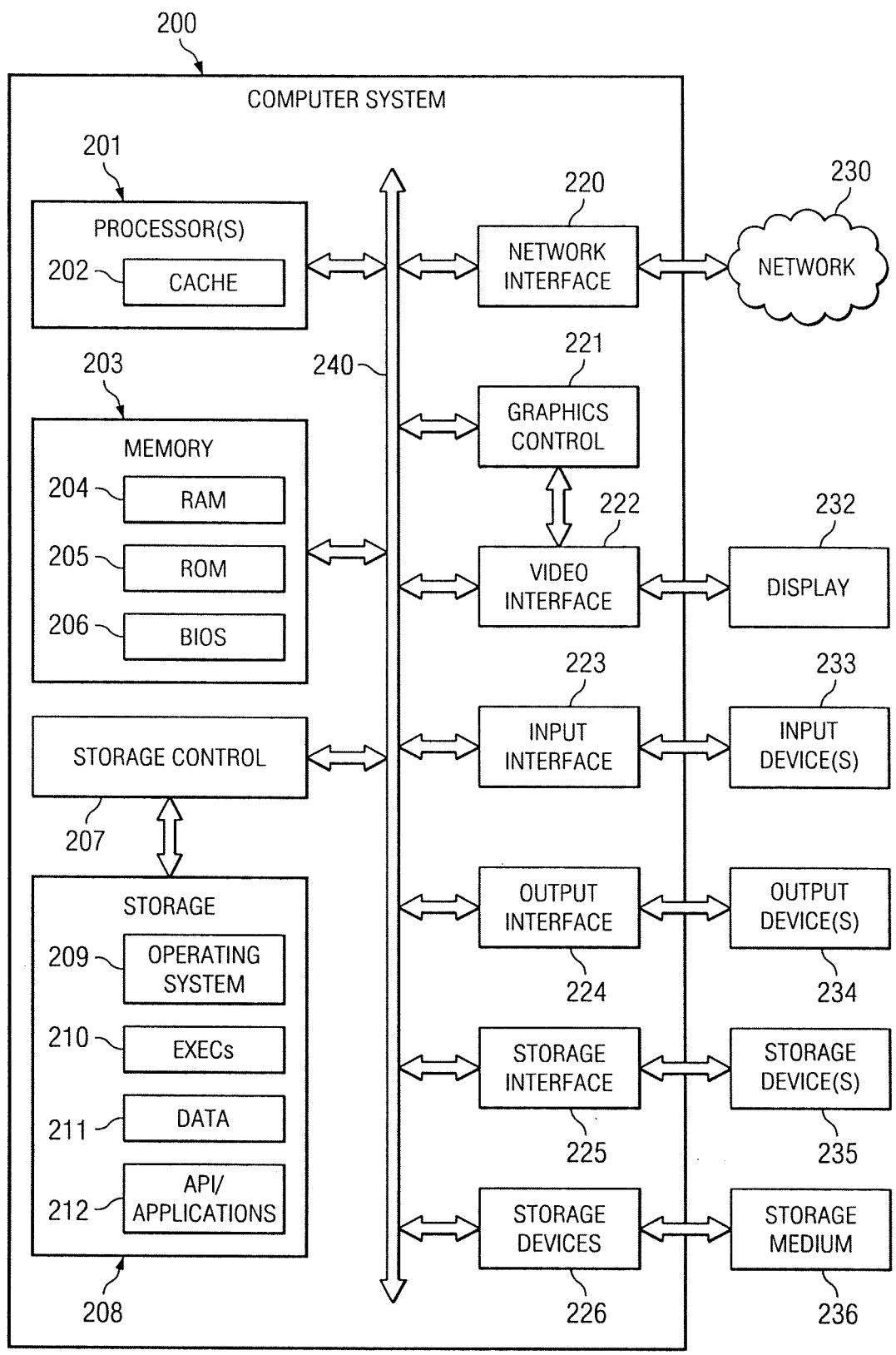
FIG. 2 illustrates an example computer system 200.

Energy management server 110 may actually include one or more software components residing at one or more computer systems. FIG. 2 illustrates an example computer system 200. Energy management server 110 may include software components at one or more computer systems, which may be similar to example computer system 200. Particular embodiments may implement various functions of energy management server 110 as hardware, software, or a combination of hardware and software. As an example and not by way of limitation, one or more computer systems may execute particular logic or software to perform one or more steps of one or more processes described or illustrated with respect to energy management server 110. One or more of the computer systems may be unitary or distributed, spanning multiple computer systems or multiple datacenters, where appropriate. The present disclosure contemplates any suitable computer system. Herein, reference to logic may encompass software, and vice versa, where appropriate. Reference to software may encompass one or more computer programs, and vice versa, where appropriate. Reference to software may encompass data, instructions, or both, and vice versa, where appropriate. Similarly, reference to data may encompass instructions, and vice versa, where appropriate.

One or more tangible computer-readable media may store or otherwise embody software implementing particular embodiments. A tangible computer-readable medium may be any medium capable of carrying, communicating, containing, holding, maintaining, propagating, retaining, storing, transmitting, transporting, or otherwise embodying software, where appropriate. A tangible computer-readable medium may be a biological, chemical, electronic, electromagnetic, infrared, magnetic, optical, quantum, or other suitable medium or a combination of two or more such media, where appropriate. A tangible computer-readable medium may include one or more nanometer-scale components or otherwise embody nanometer-scale design or fabrication. Example tangible computer-readable media include, but are not limited to, application-specific integrated circuits (ASICs), compact discs (CDs), field-programmable gate arrays (FPGAs), floppy disks, floptical disks, hard disks, holographic storage devices, magnetic tape, caches, programmable logic devices (PLDs), random-access memory (RAM) devices, read-only memory (ROM) devices, semiconductor memory devices, network addressable storage, and other suitable computer-readable media and/or mediums.

Software implementing particular embodiments may be written in any suitable programming language (which may be procedural or object oriented) or combination of programming languages, where appropriate. Any suitable type of computer system (such as a single- or multiple-processor computer system) or systems may execute software implementing particular embodiments, where appropriate. A general-purpose computer system may execute software implementing particular embodiments, where appropriate.

The components in FIG. 2 are examples only and do not limit the scope of use or functionality of any hardware, software, embedded logic component, or a combination of two or more such components implementing particular embodiments. Computer system 200 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers. Computer system 200 includes a display 232, one or more input devices 233 (which may, for example, include a keypad, a keyboard, a mouse, a stylus, etc.), one or more output devices 234 (which may, for example, include one or more speakers), one or more storage devices 235, and various tangible storage media 236.

Bus 240 connects a wide variety of subsystems. Herein, reference to a bus encompasses one or more digital signal lines serving a common function, where appropriate. Bus 240 may be any of several types of bus structures including a memory bus, a peripheral bus, or a local bus using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, and an Accelerated Graphics Port (AGP) bus.

Processor(s) 201 (or central processing unit(s) (CPU(s))) optionally contains a cache memory unit 202 for temporary local storage of instructions, data, or computer addresses. Processor(s) 201 are coupled to storage devices including memory 203. Memory 203 may include random access memory (RAM) 204 and read-only memory (ROM) 205. ROM 205 may act to communicate data and instructions unidirectionally to processor(s) 201, and RAM 204 may act to communicate data and instructions bidirectionally with processor(s) 201. ROM 205 and RAM 204 may include any suitable computer-readable media described below. Fixed storage 208 is connected bidirectionally to processor(s) 201, optionally through storage control unit 207. Fixed storage 208 provides additional data storage capacity and may also include any suitable computer-readable media described. Storage 208 may be used to store operating system 209, EXECs 210, data 211, application programs 212, and the like.

Typically, storage 208 is a secondary storage medium (such as a hard disk) that is slower than primary storage. Information in storage 208 may, in appropriate cases, be incorporated as virtual memory in memory 203.

Processor(s) 201 is connected to multiple interfaces, such as graphics control 221, video interface 222, input interface 223, output interface 224, and storage interface 225. These interfaces are in turn connected to appropriate devices, as illustrated. In general, an input/output (I/O) device may be a video display, a track ball, a mouse, a keyboard, a microphone, a touch-sensitive display, a transducer card reader, a magnetic- or paper- tape reader, a tablet, a stylus, a voice or handwriting recognizer, a biometrics reader, another computer systems, or other suitable I/O device or a combination of two or more such I/O devices. Processor(s) 201 may connect to another computer system or to data communications network 230 (which may include networks 106, 109, and, more generally, 100) through network interface 220. With network interface 220, CPU 201 may communicate with network 230 in the course of performing one or more steps of one or more processes described or illustrated herein, according to particular needs. Moreover, one or more steps of one or more processes described or illustrated herein may execute solely at CPU 201. In addition or as an alternative, one or more steps of one or more processes described or illustrated herein may execute at multiple CPUs 201 that are remote from each other across network 230.

In particular embodiments, when computer system 200 is connected to network 230, computer system 200 may communicate with other devices connected to network 230. Communications to and from computer system 200 may be sent through network interface 220. For example, network interface 220 may receive incoming communications (such as requests or responses from other devices) in the form of one or more packets (such as Internet Protocol (IP) packets) from network 230 and computer system 200 may store the incoming communications in memory 203 for processing. Computer system 200 may similarly store outgoing communications (such as requests or responses to other devices) in the form of one or more packets in memory 203 and communicated to network 230 from network interface 220. Processor(s) 201 may access these communication packets stored in memory 203 for processing.

Computer system 200 may provide functionality as a result of processor(s) 201 executing software embodied in one or more computer-readable storage media, such as memory 203. Memory 203 may store software that implements particular embodiments, and processor(s) 201 may execute the software. Memory 203 may read the software from one or more other computer-readable media (such as mass storage device(s) 235) or from one or more other sources through a suitable interface, such as network interface 220. The software may cause processor(s) 201 to carry out one or more processes or one or more steps of one or more processes described or illustrated herein. Carrying out such processes or steps may include defining data structures stored in memory 203 and modifying the data structures as directed by the software. In addition or as an alternative, computer system 200 may provide functionality as a result of logic hardwired or otherwise embodied in a circuit, which may operate in place of or together with software to execute one or more processes or one or more steps of one or more processes described or illustrated herein. Herein, reference to software may encompass logic, and vice versa, where appropriate. Moreover, reference to a computer-readable medium may encompass a circuit (such as an IC) storing software for execution, a circuit embodying logic for execution, or both, where appropriate. The present disclosure encompasses any suitable combination of hardware, software, or both.

As described above, energy management server 110 is configured to process, analyze and store the power usage information and identifying information in the central database 112, and furthermore, transmit power control signals to the buildings 102 to control the power usage of one or more power usage points in the buildings based on power management information. By way of example, the power management information may include rules and/or policies settable by a user as well as specific commands targeted at particular power usage points. Additionally, in particular embodiments, energy management server 110 is also configured to generate power usage reports for use by a user in controlling power consumption in each building 102.

In addition to energy management server 110, central database 112, and power meters 104, energy optimization system 100 may also include an energy gateway 114 at each building 102 and a plurality of energy bridges at each building 102. The energy gateway 114 and energy bridges may serve to connect particular power meters 104b through network 109 and main power meter 104a to energy management server 110. More specifically, in particular embodiments, energy gateway 114 connects to the building side of a main building power meter 104a enabling power usage data to be captured by energy management server 110 and accessed from anywhere in the world through an energy dashboard 118 (described below) via, for example, a web portal. More particularly, energy gateway may monitor power usage at any selected granularity at a building 102 as well the amount of power supplied to the building (which may be used, by way of example, for verification purposes). Although illustrated as being part of the same unit, energy gateway 114 and main power meter 104a may be physically separated individual units that are electrically connected with one another or integrally constructed as a single unit.

In particular embodiments, each energy bridge may connect one or more power meters 104b to Energy Gateway 114 over network 109. Each energy bridge may provide local intelligence for managing power usage points. In turn, power meters 104b connect individual thermostats, switches, outlets (both standard and high voltage), and other power consuming electrical systems, units, appliances, and devices to the energy bridges or directly to energy gateway 114 via network 106. The U.S. patent application Ser. No. 61/032,042 (the '042 application) filed Feb. 27, 2008 and U.S. patent application Ser. No. 12/395428 (the '428 application) filed Feb. 27, 2009, which are both hereby incorporated by reference herein for all purposes, describe systems and methods for measuring power usage of a plurality of appliances and electrical devices, and more particularly, power meters that may be used to implement power meters 104. Using non-intrusive power metering techniques, power usage for at each power consumption point (e.g., at each electrical system, unit, appliance, device, outlet, and switch) at a property can be measured with minimal hassle, the detail of which is described in the '042 and '428 applications. In this manner, power usage information can be measured at the desired granularity, such as, by way of example, building/household level, circuit level (appliance connected to a particular power circuit), and appliance/device/outlet/switch level.

In particular embodiments, energy management server 110, in conjunction with central database 112, collects, stores, and streamlines valuable power usage data into one or more reports that may take the form of a cohesive energy dashboard 118 displayable on a graphical user interface through, for example, a web portal 120. Web portal 120 generally includes any suitable computer such as, for example, computer system 200 implemented in the form of a general purpose computer, laptop computer, mobile phone, personal digital assistant (PDA), among other mobile and non-mobile devices, in combination with a suitable operating system and web browser.

Figure 3A:
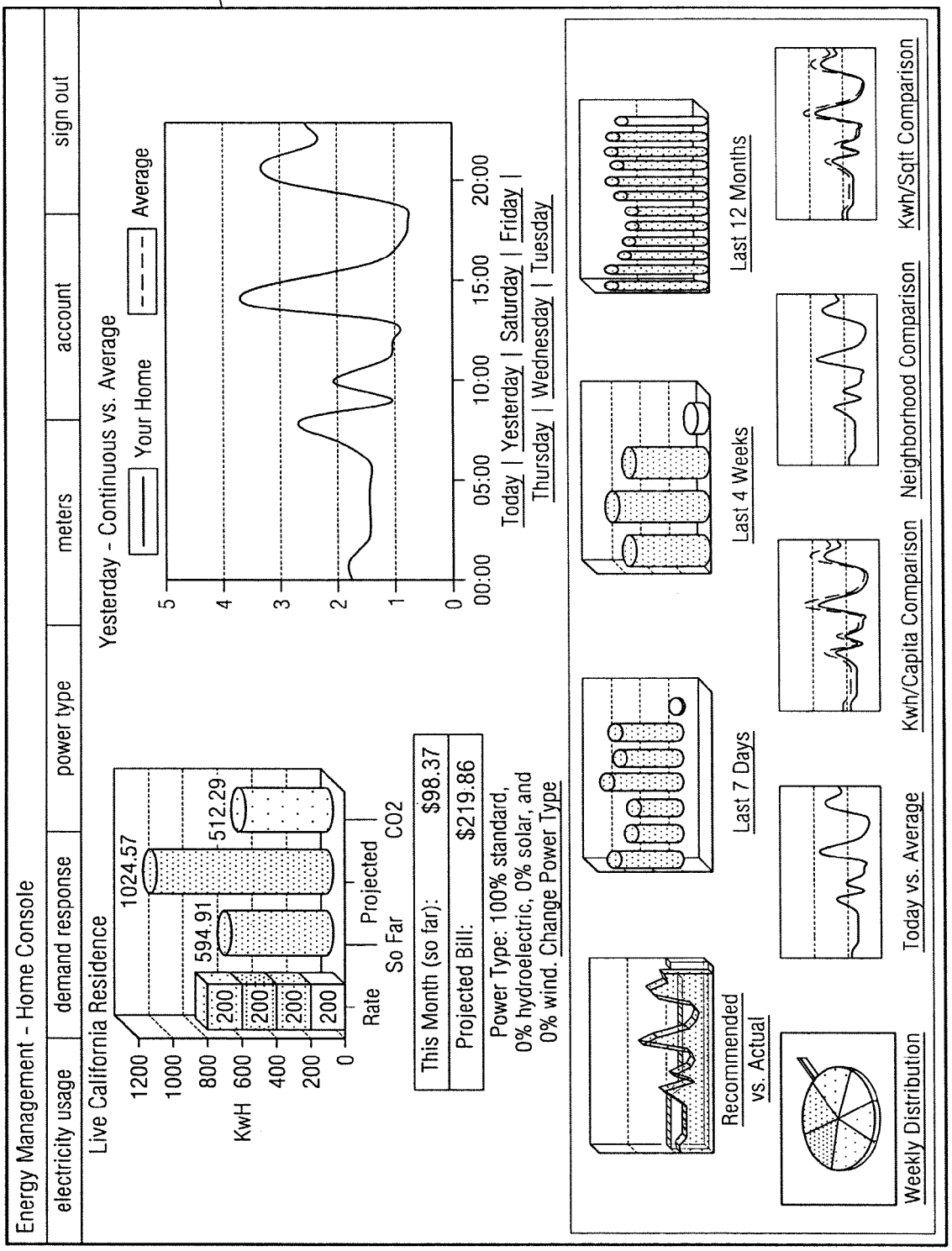
FIG. 3A illustrates a user interface for displaying energy usage information.

In particular embodiments, energy dashboard 118 provides information on power consumption, potentially in real time, at a selected granularity or combination of granularities (e.g., per device, per appliance, per group of devices/appliances, per electrical outlet, per group of outlets, per room, per floor, per circuit, per building, etc.) and, in particular embodiments, as a function of time for an associated building 102. Energy management server 110 monitors and stores data from individual rooms or units as well as from appliances, other electrical devices and other power usage points in or at a building 102, and presents the information in charts and/or graphs that provide a detailed breakdown of energy usage that can be easily viewed on a web browser. Consumers are able to view detailed breakdowns of energy usage via the energy dashboard 118 and to make adjustments accordingly. As shown in FIG. 3A, electrical energy usage as measured in real time may be displayed. In addition, a projected monthly bill may also be provided. Additionally, power usage information may also be transmitted or otherwise provided to other entities such as a utility provider.

In particular embodiments, using the Energy Dashboard 118 over a web browser at a web portal 120, a user can make immediate changes or automate (e.g., based on a set of policies and/or rules) power usage of various power usage points 105 such as, by way of example and not by way of limitation, heating, ventilating, and air conditioning (HVAC) units, appliances such as dishwashers, laundry washers and dryers, and various other electrical devices such as ceiling fans, microwaves, televisions, and computers, among many others, as shown in FIG. 3B.

In particular embodiments, energy dashboard also provides an interface for entering, specifying or otherwise choosing power management information. By way of example, energy dashboard may include text boxes, menus, pull-down menus, windows, as well as dials and knobs (e.g., virtual dials and knobs in the Energy Dashboard displayed on a web browser) to control how and when energy is used at a selected granularity and at a specific time or range of time, and in accordance with a desired or selected set of rules and policies (e.g., based on market prices and demand response incentives). In particular embodiments, a user specifies specific rules and/or policies. In alternate particular embodiments, energy management server 110 generates rules and/or policies based on settings selected/chosen by a user. By way of example, policies and rules may control power-hungry equipment such as HVAC units or pool and spa heaters to optimize energy usage throughout the day. Additionally, energy management server 110 may implement permission-based profiles that may provide varying levels of access for front-desk personnel, managers, and energy utility providers, allowing each to view and make adjustments to usage according to their respective roles. Energy dashboard 118, via energy optimization system 100, enables one or more entire properties to be managed from a single location. Individual switches, outlets, groups of outlets, HVAC units, pool pumps, and other appliances or electrical devices may all be centrally controlled. As an example, hundreds of thermostats can be adjusted simultaneously. In particular embodiments, the key to saving is identifying where, when and how much power is being used as the demand occurs.

Energy management server 110 sends power control signals to an energy gateway 114 associated with a particular building(s) 102 in order to power selected power usage points 105 on and off, adjust temperature ranges and fan settings among other controls in accordance with the power management information specified in the energy dashboard 118. By way of example, energy gateway 114 may transmit power control signals to a power switch that turns a particular corresponding power usage point on or off or otherwise adjusts the power usage of the power usage point. In particular embodiments, the power switch may receive the control signals directly from the energy gateway 114, from an energy bridge, or from a power meter 104b. In one particular embodiment, the power switch may be integrally constructed with power meter 104b such that a power meter 104b comprises the power switch or such that the power switch comprises the power meter 104b. In some embodiments, one or both of the power switch and power meter 104b may reside within the particular corresponding power usage point.

The described system enables users to save energy and money as well as capitalize on utility company demand response incentive programs. More particularly, in addition to viewing energy consumption, consumers are also able to adjust energy usage in accordance with demand response methodology for various power usage points. By way of example, during certain times, such as high demand or emergency, a consumer may allow an energy provider to progressively reduce power usage, which benefits both the consumer (lowering costs) and the energy provider (reducing demand or load). In particular embodiments, a user is able to apply settings, via energy dashboard 118, that govern whether a particular power usage point 105 should be turned on or off at various times or circumstances (e.g., manual, alert, warning, emergency, etc.). In addition, a user may also apply more specific settings. For instance, a user may set a desired temperature for an (HVAC) unit or pooUspa heater. In addition, a consumer may also be able to dim lights, to turn off a water heater at certain times or days, etc., and to make other detailed settings. In some particular embodiments, various preset settings, which may be provided by the user/consumer and/or the energy providers, are provided to make the power setting process more user-friendly.

Figure 4:
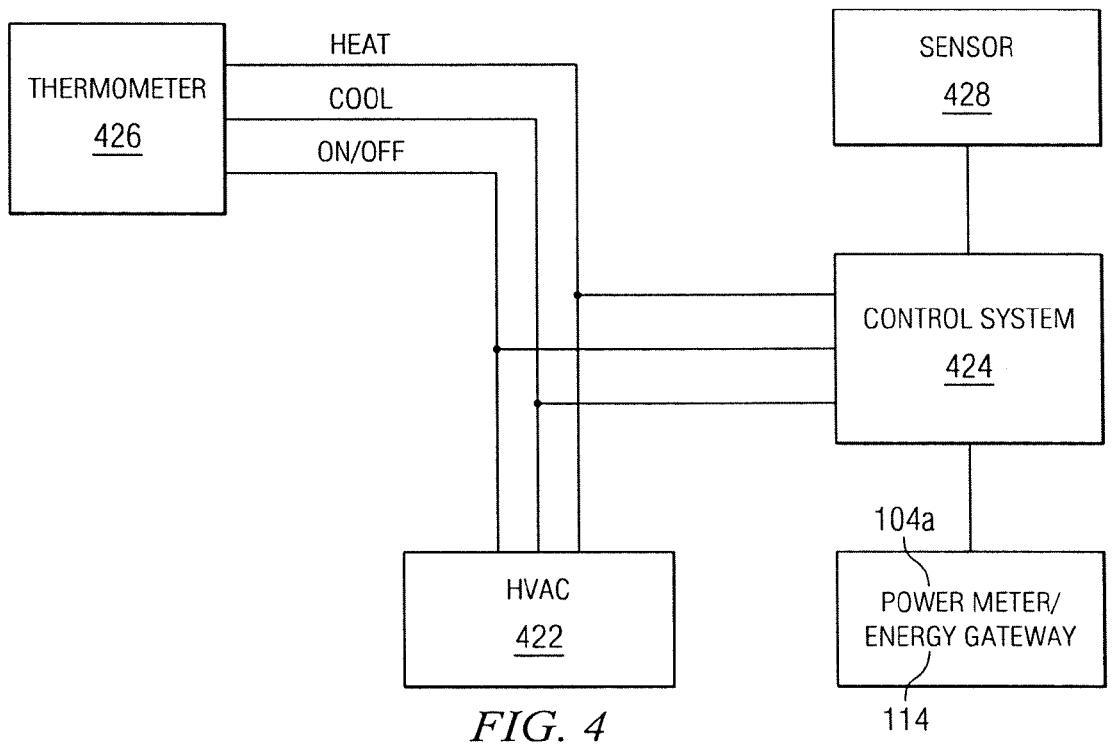
FIG. 4 is a simplified block diagram illustrating a system for controlling an HVAC unit

FIG. 4 is a simplified block diagram illustrating, by way of example, a system for controlling an HVAC unit 422 through a control system 424 and a thermostat 426. For example, the control system 424 may be a part of the energy optimization system 100 and demand response system and is connected to both the thermometer and to network 109 via power meter 104b and/or energy bridge and energy gateway 114 and ultimately to energy management server 110, from which the control system receives various information including the power control signals. In particular embodiments, control system 424 may be configured to turn the HVAC unit 422 on or off based on the information received from the thermostat 426 and the power meter 104b. In some embodiments, the system may also include a proximity sensor 428 that determines whether there are people present within the serving area of the HVAC. In a specific embodiment, the control system determines whether the HVAC should be turned on based on a variety of factors, such as desired temperature range as set by a user via energy dashboard 118, demand response, presence of personnel as determined by the proximity sensor 428, etc. By way of example, the control system 424 may use a decision matrix to determine the appropriate state of the HVAC unit 422.

Figure 5:
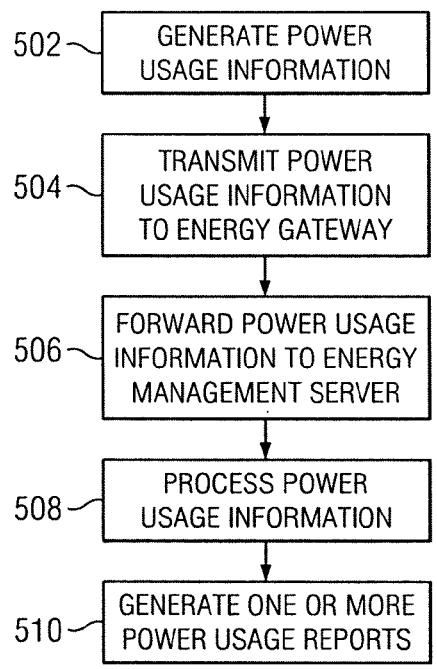
FIG. 5 illustrates an example method for generating power usage reports.

FIG. 5 illustrates an example method for generating power usage reports. At 502 power usage information is generated by a power meter coupled with a power usage point within a building based on the power usage of the power usage point. In particular embodiments, power usage information may be collected on a continuous basis, at period or other intervals, and/or in response to changes in power usage or in response to control signals. At 504, the power meter sends the power usage information over a local sub network, which may be a power line network, to an energy gateway at a power entrance site to the building. Energy gateway then forwards (with or without additional processing) the power usage information at 506 to an energy management server. The energy management server may then filter, analyze, correlate (e.g., based on time and building/device identifying information) and otherwise process the power usage information at 508 prior to generating one or more power usage reports at 510 for presentation to a user.

Figure 6:
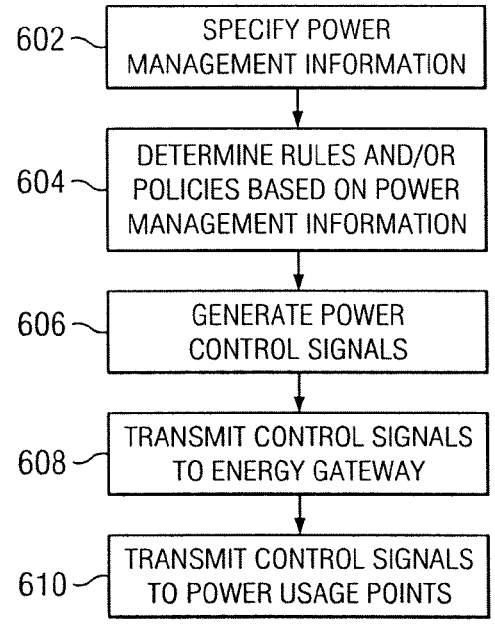
FIG. 6 illustrates an example method for transmitting control signals to power usage points.

FIG. 6 illustrates an example method for transmitting control signals to power usage points. At 602, a user specifies power management information. By way of example, the user may specify/enter power management information at an energy dashboard displayed over a graphical user interface at a computer system connected via a network to an energy management server. At 604, energy management server determines rules and/or policies based on the power management information. At 606, energy management server generates control signals based on the power management information and/or rules and/or policies. At 608, the energy management server transmits the control signals via a network to an energy gateway to a power usage site such as a building 102. The energy gateway then transmits the received control signals (with or without further processing) at 610 to particular power usage points which then consume energy based on the control signals. By way of example, the energy gateway may transmit the control signals over a power line network to power switches coupled with the power usage points.

Although the present disclosure describes and illustrates particular steps of the methods of FIGS. 5 and 6 as occurring in a particular order, the present disclosure contemplates any suitable steps of the methods of FIGS. 5 and 6 occurring in any suitable order. Moreover, although the present disclosure describes and illustrates particular components carrying out particular steps of the methods of FIGS. 5 and 6, the present disclosure contemplates any suitable combination of any suitable components carrying out any suitable steps of the methods of FIGS. 5 and 6.

Various embodiments may also provide some or all of the following features. As illustrated in FIG. 7, a user may also be able to select, via energy dashboard 118, whether to use hydroelectric, wind, or solar power, each of which generally carries a different per unit price. A projected cost is also displayed in FIG. 7. To make selecting power type easier, various presets may be provided. In a specific embodiment, one preset includes "greenest", "cheapest", and "flexible". For the "greenest" preset, the most environmental friendly power types are selected (e.g. solar power). For the "cheapest" preset, the least expensive power supply provider at any given time is selected to reduce monthly energy bill. In a "flexible" present, a user is able to set relationships between groups (throttling between one group and another to assure minimized impact to grid). For example, throttles afford the ability to adjust duty cycle of operation.

FIG. 8 illustrates energy consumption (or savings) associated with various states of demand response.

Furthermore, through the interface illustrated in FIG. 9, a user is able to enter/select power management information and view energy consumption information for multiple addresses.

As alluded earlier, the energy optimization system 100 is not only convenient to consumers, but it is also useful for power companies. As illustrated in FIG. 10, a power company is able to set various "tariffs" for various types of energy usage, thereby influencing energy usage behaviors of consumers.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

What is claimed is:

1. A system for the control and reporting of energy consumption, the system comprising:
a communication network;
a plurality of power meters, the power meters including:
a first power meter operable to measure power usage of a household;
a second power meter operable to measure power usage of a household appliance; and
a third power meter operable to measure power usage of a HVAC unit;
a plurality of power switches, the plurality of power switches including a first power switch connected to the HVAC unit; and
a demand response system, the demand response system being connected to the plurality of power meters through the communication network, the demand response system operable to send control signals to the plurality of power switches based on predetermined parameters, wherein:
the demand response system includes a user interface operable to display power management information for the household, the power management information associated with the plurality of power meters, the user interface further operable to receive one or more inputs for managing energy consumption associated with the plurality of power meters;
the demand response system includes a plurality of customer permission-based profiles that each provide a different level of access to the user interface operable to display power management information for the household, wherein each different level of access to the user interface provides a different level of display of the power management information for the household and a different level of input ability for managing energy consumption of the household, wherein the plurality of customer permission-based profiles comprise a profile for a household owner and comprise a profile for a user other than the household owner or an energy provider employee, the profile for the user providing a lower level of access to the user interface than the profile for the household owner.

2. The system of claim 1, wherein the user interface is operable to display power usage and cost based information from the plurality of power meters.

3. The system of claim 1, wherein the user interface is operable to receive an alternative energy type selection that is selected from a group consisting of:
hydroelectric power;

wind power; and solar power.

4. The system of claim 1, wherein the user interface is operable to receive a temperature setting selection.

5. The system of claim 1, further including a thermometer and a proximity sensor that are connected to the demand response system.

6. A system, comprising:
a communication network;
a power meter operable to measure power usage at a household;
a power switch connected to the power meter and further connected to a power usage point at the household; and
a demand response system connected to the power meter through the communication network, the demand response system operable to send one or more control signals to the power switch in order to adjust power usage of the power usage point, the demand response system further operable to provide, for display, a user interface that includes power management information associated with the household, wherein:
the user interface is operable to receive one or more inputs for managing energy consumption at the household;
the demand response system includes a plurality of customer permission-based profiles that each provide a different level of access to the user interface operable to display power management information for the household, wherein each different level of access to the user interface provides a different level of display of the power management information for the household and a different level of input ability for managing energy consumption of the household, wherein the plurality of customer permission-based profiles comprise a profile for a household owner and comprise a profile for a user other than the household owner or an energy provider employee.

7. The system of claim 6, further comprising a second power meter connecting the power switch to the power meter, the second power meter measuring power usage of the power usage point.

8. The system of claim 7, further comprising:
one or more additional power switches, each of the additional power switches connected to one or more additional power usage points at the household; and
one or more additional power meters, each of the additional power meters connected to the power meter and operable to measure power usage at one or more of the additional power usage points.

9. The system of claim 6, wherein the power management information includes power usage information associated with only a single floor of the household.

10. The system of claim 6, wherein the power management information includes power usage information associated with only a single room of the household.

11. The system of claim 6, wherein the power management information includes power usage information associated with only the power usage point.

12. The system of claim 6, wherein the power management information includes a projected monthly bill for the household.

13. The system of claim 6, wherein the user interface is operable to receive an alternative energy type selection that is selected from a group consisting of:
hydroelectric power;
wind power; and
solar power.

14. The system of claim 6, wherein the user interface is operable to receive a temperature setting selection for the power usage point.

15. The system of claim 6, wherein the profile for the user provides a lower level of access to the user interface than the profile for the household owner.

16. A method, comprising:
receiving, at a demand response system, a measure of power usage at a household from a power meter;
providing, for display, a user interface that includes power management information associated with the household, the user interface operable to receive one or more inputs for managing energy consumption at the household, the user interface_including a plurality of different access levels each associated with one of a plurality of customer permission-based profile for the household, wherein each different level of access to the user interface provides a different level of display of the power management information for the household and a different level of input ability for managing energy consumption of the household, wherein the plurality of customer permission-based profiles comprise a profile for a household owner and comprise a profile for a user other than the household owner or an energy provider employee; and
in response to the one or more inputs for managing energy consumption at the household, sending one or more control signals to a power switch of the household in order to adjust power usage of a power usage point of the household.

17. The method of claim 16, wherein the power management information includes power usage information associated with only a single floor of the household.

18. The method of claim 16, wherein the power management information includes power usage information associated with only a single room of the household.

19. The method of claim 16, wherein the power management information includes power usage information associated with only the power usage point.

20. The method of claim 16, wherein the power management information includes a projected monthly bill for the household.

* * * * *